(12) United States Patent
Takaki et al.

(10) Patent No.: US 6,850,750 B2
(45) Date of Patent: Feb. 1, 2005

(54) RADIO SET AND FREQUENCY CONVERTING METHOD THEREFOR

(75) Inventors: Tetsuya Takaki, Tokyo (JP); Masataka Mitama, Tokyo (JP)

(73) Assignee: NEC Corporation, Tokyo (JP)

( * ) Notice: Subject to any disclaimer, the term of this patent is extended or adjusted under 35 U.S.C. 154(b) by 672 days.

(21) Appl. No.: 09/781,251

(22) Filed: Feb. 13, 2001

(65) Prior Publication Data

US 2001/0014596 A1 Aug. 16, 2001

(30) Foreign Application Priority Data

Feb. 16, 2000 (JP) ........................................ 2000-037334

(51) Int. Cl.⁷ ............................. H04B 1/26; H04B 15/00
(52) U.S. Cl. ........................ 455/324; 455/317; 455/323; 455/86
(58) Field of Search ................................. 455/324, 313, 455/319, 323, 334, 295, 296, 112, 113; 375/114.1, 114.3, 76, 86, 219

(56) References Cited

U.S. PATENT DOCUMENTS 5,740,521 A * 4/1998 Hulkko et al. ................ 455/76
5,752,169 A * 5/1998 Hareyama et al. ............ 455/76
5,819,165 A * 10/1998 Hulkko et al. ............... 455/126
6,397,044 B1 * 5/2002 Nash et al. .................... 455/73

FOREIGN PATENT DOCUMENTS

| CN | 1140941 A | 1/1997 |
| GB | 2 344 948 A | 6/2000 |
| JP | 8-223075 | 8/1996 |
| JP | 8-223075 A | 8/1996 |
| JP | 2000-13274 A | 1/2000 |
| JP | 2000-13274 | 1/2000 |
| WO | WO 99/26336 A1 | 5/1999 |

* cited by examiner

Primary Examiner—Duc M. Nguyen
(74) Attorney, Agent, or Firm—Sughrue Mion, PLLC

(57) ABSTRACT

To obtain a radio set in a direct conversion system so as not to have any undesired influence of a signal of a transmission system on a reception system. In a transmission system, a frequency Flo of a local signal used in a frequency converting process performed by a frequency converter is expressed as (M/N)·Frx by a frequency conversion circuit. Based on the frequency Flo and the transmission frequency Ftx, a intermediate frequency Ftxif of the transmission system is expressed as Ftxif=Flo−Ftx=(M/N)·Frx−Ftx which is an oscillation frequency of a second local oscillator. Therefore, an equation exists as Ftx+Ftxif={(M/N)·Frx−Ftxif}+Ftxif=(M/N)·Frx, although Ftx+Ftxif leak to the reception system. As a result, since it is different from a reception frequency band, no interference wave is generated for a received signal.

16 Claims, 6 Drawing Sheets

RADIO SET AND FREQUENCY CONVERTING METHOD THEREFOR

BACKGROUND OF THE INVENTION

1. Field of the Invention

The present invention relates to a radio set for performing radio communications, and more specifically to a frequency conversion system of a radio set using a direct conversion system.

2. Description of the Prior Art

Generally, a radio set for performing radio communications includes a radio unit for converting a frequency, and a base band process unit for modulating or demodulating voice and image data. Conventionally, the method of configuring a radio unit forming a radio set can be a double conversion system for performing a frequency converting process two times, a single conversion system for performing a frequency converting process once, etc.

Assuming that the double conversion system or the single conversion system is operated using a reception system of a radio unit forming a radio set, in the case of the double conversion system, a received high frequency signal is frequency-converted into a received signal on a first intermediate frequency band using a first frequency converter, then the signal is frequency-converted into a received signal on a second intermediate frequency band using a second frequency converter, the resultant signal is orthogonally demodulated by an orthogonal demodulator, and is frequency-converted into a received signal on a base band. Then, the base band process unit demodulates the received signal.

Furthermore, in the single conversion system, a received high frequency signal is frequency-converted into a received signal on an intermediate frequency band by a frequency converter, orthogonally demodulated by an orthogonal demodulator, and frequency-converted into a received signal on a base band. Then, the received signal is demodulated by the base band process unit.

In the radio set in the double or single conversion system, a higher harmonics signal or a distortion signal is generated by nonlinearity of an amplifier, a frequency converter or the like forming a radio set. These higher harmonics signals and distortion signals are interference waves for other radio sets by functioning as unnecessary radiation in a transmission system, and, in a reception system, are interference waves by functioning as interference waves which deteriorate the reception characteristic of the system. Thus, the double conversion system or the single conversion system uses means for removing the interference waves by these higher harmonics signals and distortion signals by using a plurality of band pass filters for passing only necessary signals for transmission.

To realize a smaller and lighter radio set, the double conversion system and the single conversion system require a plurality of band pass filters and so forth as described above, and there is a limit in realizing a radio set smaller and lighter than that having the current configuration. Under the situation, a direct conversion system has attracted attention as a practical system of realizing a smaller and lighter radio set.

In the direct conversion system, a reception system orthogonally demodulates a received signal on a high frequency band, directly performs a frequency-converting process into a received signal on a base band, and then demodulates the signal by a base band process unit. A transmission system orthogonally modulates a transmission signal on a base band, performs a frequency-converting process directly into a high frequency signal, and then transmits it. In the direct conversion system, since no intermediate frequency is used during the radio process performed by a radio unit, a higher harmonics signal or a distortion signal is not generated for a signal on an intermediate frequency band. That is, the unnecessary radiation or interference waves due to the higher harmonics signals or the distortion signals can be reduced as compared with the double conversion system or the single conucersion system. Therefore, it is not necessary to provide a plurality of band pass filters, thereby successfully realizing a smaller and lighter radio set.

Described below will be a radio set in the direct conversion system. First, assuming that the direct conversion system is applied to each of the transmission system and the reception system forming a radio unit of a radio set, when the direct conversion system is applied to a transmission system, the frequency of a local oscillation signal is equal to the frequency of a transmission signal. Therefore causing the problem that the leakage component of the local oscillation signal cannot be removed. On the other hand, when the direct conversion system is applied to a reception system, the frequency of a local oscillation signal is equal to the frequency of a reception signal, thereby generating the leakage component of the local oscillation signal. However, the generated leakage component is equivalent to a direct current voltage component which can be removed at the output terminal of the reception system. Therefore, a radio set in the direct conversion system can be the optimum system when the direct conversion system is applied to a reception system while the single conversion system is applied to a transmission system.

FIG. 7 is an example of a block diagram of a radio set having the above mentioned configuration. As shown in FIG. 7, a direct conversion radio set includes: an antenna 101; a transmission and reception common circuit 102; a high frequency amplifier 103; a band pass filter 104; a variable gain amplifier 105; an orthogonal demodulator 106; a low pass filter 107; a low pass filter 108; abase band process unit 109; a first local oscillator 110; a second local oscillator 111; an isolator 112; a transmission amplifier 113; a band pass filter 114; a high frequency amplifier 115; a band pass filter 116; a frequency converter 117; a band pass filter 118; a variable gain amplifier 120; and an orthogonal modulator 121.

The antenna 101 receives or transmits a signal from or to a base station of radio communications not shown in the attached drawings, and is connected to a transmission and reception input/output terminal of the transmission and reception common circuit 102 for filtering a transmission/reception signal. The reception side output terminal of the transmission and reception common circuit 102 is connected to the input terminal of the high frequency amplifier 103 for amplifying a received signal on a radio band, and the output terminal of the high frequency amplifier 103 is connected to the input terminal of the band pass filter 104 for passing only the reception band of the radio frequency band.

The output terminal of the band pass filter 104 is connected to the input terminal of the variable gain amplifier 105 for controlling a gain depending on the power of a received signal, and the output terminal of the variable gain amplifier 105 is connected to the input terminal of the radio frequency band of the orthogonal demodulator 106 for orthogonally demodulating the received signal of the radio frequency band, and frequency-converting the signal into a received signal of an I component and a Q component of a base band. The input terminal of the local signal of the orthogonal demodulator 106 is connected to the output terminal of the local signal of the first local oscillator 110 for oscillating the first local signal. The output terminals of the I component and the Q component of the orthogonal demodulator 106 are respectively connected to the input terminals of the low pass filter 107 and the low pass filter 108, and the output terminals of the low pass filters 107 and 108 are connected to the input terminals of the reception I and Q components of the base band process unit 109.

The output terminals of a transmission I component and a transmission Q component of the base band process unit 109 are connected to the input terminals of an I component and a Q component of the orthogonal modulator 121 for orthogonally modulating the transmission signal of the base band, and frequency-converting the signal into the transmission signal of the intermediate frequency band. The output terminal of the intermediate frequency band signal of the orthogonal modulator 121 is connected to the input terminal of the variable gain amplifier 120. In addition, the input terminal of the local signal of the orthogonal modulator 121 is connected to the output terminal of the local signal of the second local oscillator 111 for oscillating a second local signal. The output terminal of the variable gain amplifier 120 is connected to the input terminal of the band pass filter 118 for passing only the transmission signal of the intermediate frequency band, and the output terminal of the band pass filter 118 is connected to the input terminal of the intermediate frequency band of the frequency converter 117 for frequency-converting the transmission signal of the intermediate frequency band into the transmission signal of the radio frequency band.

Furthermore, the input terminal of the local signal of the frequency converter 117 is connected to the output terminal of the first local signal output from the first local oscillator 110. The output terminal of the radio frequency band signal of the frequency converter 117 is connected to the input terminal of the band pass filter 116 for removing the higher harmonics and the unnecessary radiation of image components output from the frequency converter 117, and passing only the transmission signal of the radio frequency band. The output terminal of the band pass filter 116 is connected to the input terminal of the high frequency amplifier 115 for amplifying the transmission signal of the radio frequency band.

The output terminal of the high frequency amplifier 115 is connected to the input terminal of the band pass filter 114 for removing the higher harmonics component output from the high frequency amplifier 115, and passing only the transmission signal of the radio frequency band. The output terminal of the band pass filter 114 is connected to the input terminal of the transmission amplifier 113 for amplifying the transmission signal up to the level of the power enough to output the transmission signal from the antenna 101. The output terminal of the transmission amplifier 113 is connected to the input terminal of the isolator 112, and the output terminal of the isolator 112 is connected to the input terminal of the transmission signal of the transmission and reception common circuit 102.

Described below will be the operations of the radio set. First, the operations of the reception system are described. The reception system of the direct conversion radio set receives a signal transmitted from a base station not shown in the attached drawings from the antenna 101. The received signal received by the antenna 101 passes through the transmission and reception common circuit 102, is amplified by the high frequency amplifier 103, passes through the band pass filter 104 and the variable gain amplifier 105, and is input to the orthogonal demodulator 106.

The base band process unit 109 controls the gain for the variable gain amplifier 105 such that the power of the received signal input to the orthogonal demodulator 106 can be constant. The orthogonal demodulator 106 orthogonally demodulates the input received signal by using the first local oscillation signal oscillated by the first local oscillator 110, frequency-converts the received signal of the radio frequency band into the received signal of a base band, and outputs the signal as the received signals of an I component and a Q component. In the process of orthogonally demodulating a signal by the orthogonal demodulator 106, the first local oscillation signal oscillated by the first local oscillator 110 is input to the 90° phase shifter forming part of the orthogonal demodulator 106, thereby generating a first local oscillation signal with the phase shifted by 90°.

Each of the first local oscillation signal and the 90° phase-shifted first local oscillation signal is multiplied by the received signal input to the orthogonal demodulator 106 to generate a received signal of an I component and a received signal of a Q component. The received signals of the I component and the Q component output from the orthogonal demodulator 106 respectively pass the low pass filters 107 and 108, and are input to the base band process unit 109. Then, a base band signal process is performed.

Described below will be the operations of the transmission system. In the base band process unit 109, the transmission signals of the I component and the Q component are generated and input to the orthogonal modulator 121. In the orthogonal modulator 121, the transmission signals of the I component and the Q component input to the orthogonal modulator 121 are orthogonally modulated by using the second local oscillation signal oscillated by the second local oscillator 111, and the transmission signal of the base band is frequency-converted into the transmission signal of the intermediate frequency band, and output as a transmission signal of the intermediate frequency band.

In the process of orthogonally modulating a signal in the orthogonal modulator 121, the second local oscillation signal oscillated by the second local oscillator 111 is input to the 90° phase shifter forming part of the orthogonal modulator 121, and a second local oscillation signal is generated with the phase shifted by 90°. The second local oscillation signal is multiplied by the I component transmission signal input to the orthogonal modulator 121, and the 90° phase-shifted second local oscillation signal is multiplied by the Q component transmission signal input to the orthogonal modulator 121, thereby orthogonally modulating the signal.

The transmission signal of the intermediate frequency band output from the orthogonal modulator 121 passes through the variable gain amplifier 120 and the band pass filter 118, and is input to the frequency converter 117. In the frequency converter 117, the transmission signal of the intermediate frequency band input to the frequency converter 117 is frequency-converted into the transmission signal of the radio frequency band by using the first local oscillation signal oscillated by the first local oscillator 110, and is then output.

The transmission signal of the radio frequency band output from the frequency converter 117 passes through the band pass filter 116, the high frequency amplifier 115, and the band pass filter 114, and is input to the transmission amplifier 113. The transmission signal input to the transmission amplifier 113 is amplified up to the power to be output from the antenna 101, and is then output. The transmission signal output from the transmission amplifier 113 passes through the isolator 112 and the transmission and reception common circuit 102, and is then output from the antenna 101.

With the configuration in which the direct conversion system is applied to the reception system of the radio set while the single conversion system is applied to the transmission system, the frequency used in the radio process will be described below. Assuming that the reception frequency is Frx, the transmission frequency is Ftx, and Frx>Ftx, the intermediate frequency IFtx of the transmission system is expressed as follows.

$$IFtx = Frx - Ftx \quad (1)$$

$$Ftx = Frx - IFtx \quad (2)$$

When the transmission signal and the transmission signal of the intermediate frequency band leak to the reception system, that is, when Ftx+IFtx leak to the reception system, the following equation exists.

$$Ftx + IFtx = (Frx - IFtx) + IFtx = Frx \quad (3)$$

Thus, there arises the problem of an interference wave for a received signal.

SUMMARY OF THE INVENTION

The present invention aims at providing a radio set to which the direct conversion system is applied such that a signal of the transmission system cannot have undesired influence on the reception system by suppressing the intermediate frequency of the transmission system as shown by the equation (1).

The radio set according to the present invention includes a reception system in the direct conversion system and a transmission system in the single conversion system, and the radio set has a local oscillator which can be commonly used for the direct conversion in the reception system and the single conversion in the transmission system. The radio set is provided with first frequency conversion means for converting the frequency of the local oscillator input to the frequency converter for the single conversion of the transmission system such that the intermediate frequency of the transmission system is not equal to the difference between the reception frequency and the transmission frequency.

Furthermore, the radio set is provided with second frequency conversion means for further converting the oscillation frequency of the local oscillator for the direct conversion of the reception system. The first or second frequency conversion means includes a multiplication unit for multiplying the oscillation frequency of the local oscillator by a conversion constant. The multiplication unit includes at least one of the frequency multiplier and the frequency divider. The frequency multiplier is an M (positive number other than 0) multiplier, and the frequency divider is an N (positive number other than 0, and M≠N) divider.

The radio set further includes a channel control means for variably controlling the channel frequencies of the transmission system and the reception system simultaneously. The channel control means is configured such that the oscillation frequency of the local oscillator and the conversion constant of the first frequency conversion means can be variably controlled. The transmission system includes the second local oscillator for orthogonally modulating the base band signal, and the channel control means variably controls the oscillation frequencies of the second local oscillator and the local oscillator of the transmission and the reception systems. Furthermore, the channel control means performs the control such that the transmission and reception channel frequencies can constantly maintain predetermined intervals.

The frequency converting method according to the present invention includes a reception system in the direct conversion system and a transmission system in the single conversion system, and the radio set has a local oscillator which can be commonly used for the direct conversion in the reception system and the single conversion in the transmission system. The method is also provided with a step of converting the frequency of the local oscillator input to the frequency converter for the single conversion of the transmission system such that the intermediate frequency of the transmission system cannot be equal to the difference between the reception frequency and the transmission frequency.

Then, the method also has the step of further converting the oscillation frequency of the local oscillator for the direct conversion of the reception system, the step of variably controlling the channel frequencies of the transmission and reception systems simultaneously. Furthermore, the oscillation frequencies of the second local oscillator for orthogonally modulating the base band signal in the transmission system and the local oscillator commonly used in the transmission and reception systems can be variably controlled simultaneously, and the transmission and reception channel frequencies can be variably controlled such that they can constantly maintain predetermined intervals.

Described below will be the operations of the present invention. To avoid the relationship of the intermediate frequency of the transmission system as shown by the equation (1), a frequency conversion circuit obtained by combining a frequency multiplier with a frequency divider is provided at the output terminal of the oscillator for oscillating a local signal provided for the frequency converter for converting the transmission signal of the intermediate frequency band configuring the transmission system into the transmission signal of the radio frequency band. The frequency conversion circuit obtained by combining the frequency multiplier with the frequency divider provided at the output terminal of the oscillator can be either a frequency conversion circuit having only a frequency multiplier or a frequency conversion circuit having only a frequency divider.

DESCRIPTION OF THE PREFERRED EMBODIMENTS

Figure 1:
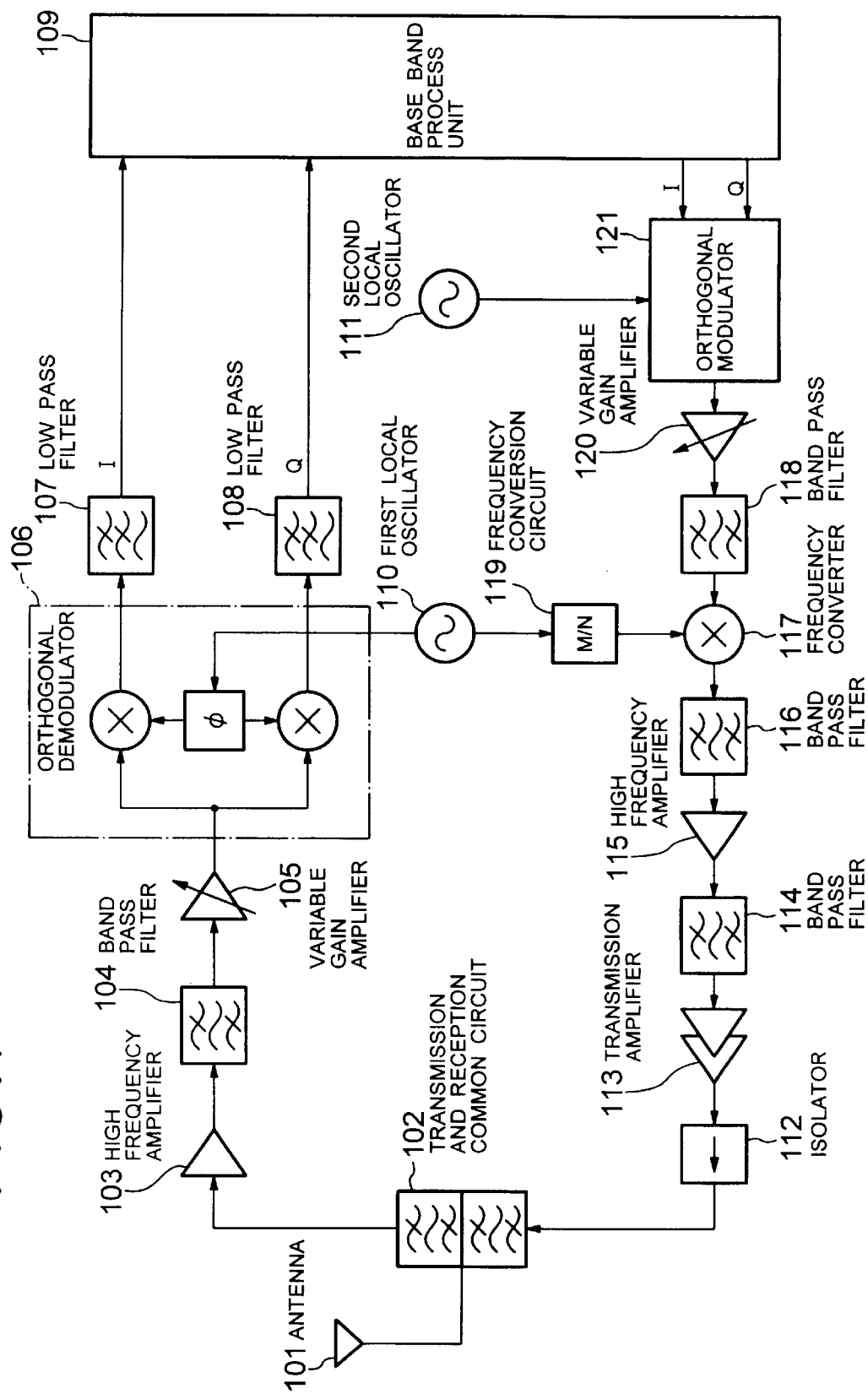
FIG. 1 is a block diagram showing a configuration of a direct conversion radio set according to an embodiment of the present invention.
Figure 7:
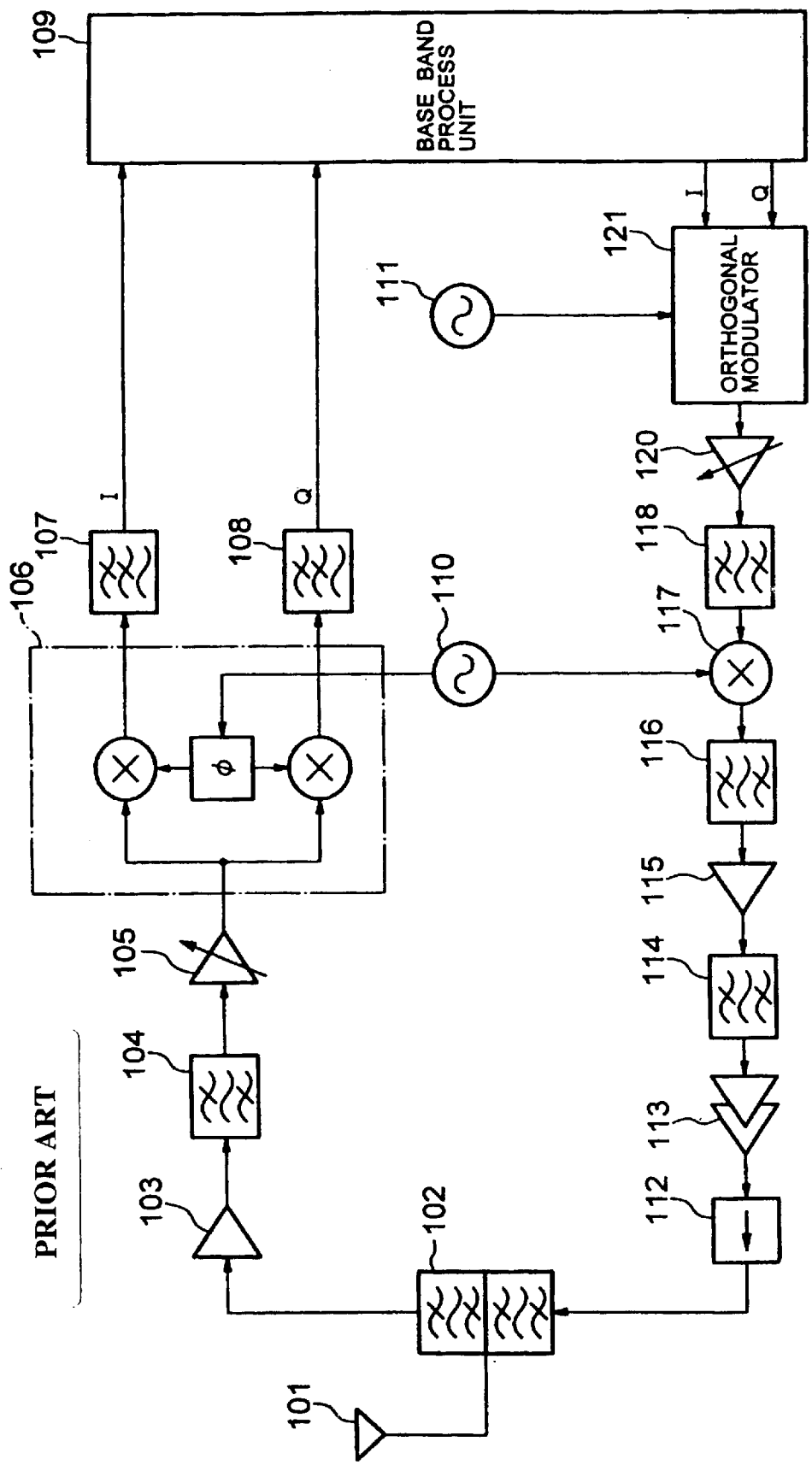
FIG. 7 is a block diagram showing a configuration of a conventional direct conversion radio set.

The embodiments of the present invention will be described below by referring to the attached drawings. FIG. 1 is a block diagram of the configuration of an embodiment of the present invention, and contains common reference numerals for the equivalent units shown in FIG. 7. For avoiding redundant explanation, the radio set shown in FIG. 1 is explained only for the portions different from those in FIG. 7. That is, in FIG. 1, a frequency conversion circuit 119 is inserted between the oscillation output of the first local oscillator 110 and the input of the local oscillation of the frequency converter 117. Otherwise, the configurations are common between FIGS. 1 and 7.

In FIG. 1, the frequency conversion circuit 119 multiplies by M the oscillation frequency of the first local signal oscillated by the first local oscillator 110, divides it into N, and outputs the result to the frequency converter 117. Assuming that the frequency of the signal output from the frequency conversion circuit 119 is Flo, the intermediate frequency Ftxif of the transmission system is expressed as follows.

$$Ftxif = Flo - Ftx \quad (4)$$

Flo can be expressed as follows.

$$Flo = (M/N) \cdot Frx \quad (5)$$

Therefore, the following equation exists from the equations (4) and (5).

$$Ftx = (M/N) \cdot Frx - Ftxif \quad (6)$$

As a result, Ftx+Ftxif is expressed by the following equation.

$$Ftx + Ftxif = \{(M/N) \cdot Frx - Ftxif\} + Ftxif = (M/N) \cdot Frx \quad (7)$$

Therefore, when a transmission signal and a transmission signal of the intermediate frequency band leak to the reception system, that is, when Ftx+Ftxif leak to the reception system, the frequency (M/N)·Frx is different from the reception frequency band Frx as indicated by the equation (7), thereby causing no interference wave for a received signal.

Described below will be the operations according to the embodiment of the present invention. First, the operations of the reception system are explained. The antenna 101 receives a signal transmitted from a base station not shown in the attached drawings. The received signal received by the antenna 101 passes through the transmission and reception common circuit 102, is amplified by the high frequency amplifier 103, passes through the band pass filter 104 and the variable gain amplifier 105, and is input to the orthogonal demodulator 106.

The gain of the variable gain amplifier 105 is controlled by the base band process unit 109 such that the power of the received signal input to the orthogonal demodulator 106 can be constant. The orthogonal demodulator 106 orthogonally demodulates the input received signal using the first local oscillation signal oscillated by the first local oscillator 110, frequency-converts the received signal of the radio frequency band into the received signal of the base band, and outputs the received signals of the I component and the Q component. In the process of orthogonally demodulating the signal by the orthogonal demodulator 106, the first local oscillation signal oscillated by the first local oscillator 110 is input to the 90° phase shifter forming part of the orthogonal demodulator 106, and the first local oscillation signal can be generated with the phase shifted by 90°.

The first local oscillation signal and the 90° phase-shifted first local oscillation signal are multiplied by the received signal input to the orthogonal demodulator 106, and a received signal of the I component and a received signal of the Q component are generated. The received signals of the I component and the Q component output from the orthogonal demodulator 106 respectively pass the low pass filters 107 and 108, and are input to the base band process unit 109. Then, the base band signal process is performed.

Described below will be the operations of the transmission system. In the base band process unit 109, the transmission signals of the I component and the Q component are generated and input to the orthogonal modulator 121. The orthogonal modulator 121 orthogonally modulates the transmission signals of the I component and the Q component input to the orthogonal modulator 121 by using the second local oscillation signal oscillated by the second local oscillator 111, frequency-converts the transmission signal of the base band into the transmission signal of the intermediate frequency band, and outputs the result as the transmission signal of the intermediate frequency band.

In the process of orthogonally modulating the signal by the orthogonal modulator 121, the second local oscillation signal oscillated by the second local oscillator 111 is input to the 90° phase shifter forming part of the orthogonal modulator 121, and a second local oscillation signal is generated with the phase shifted by 90°. The second local oscillation signal is multiplied by the I component transmission signal input to the orthogonal modulator 121, and the 90° phase-shifted second local oscillation signal is multiplied by the Q component transmission signal input to the orthogonal modulator 121, thereby performing orthogonal modulation.

The transmission signal of the intermediate frequency band output from the orthogonal modulator 121 passes through the variable gain amplifier 120 and the band pass filter 118, and is then input to the frequency converter 117. The frequency converter 117 frequency-converts the transmission signal of the intermediate frequency band input to the frequency converter 117 into the transmission signal of the radio frequency band by using the first local oscillation signal output from the frequency conversion circuit 119, and outputs the result. The first local oscillation signal input to the frequency converter 117 is oscillated by the first local oscillator 110, frequency-converted by the frequency conversion circuit 119, and then input to the frequency converter 117. The frequency conversion circuit 119 comprises a frequency multiplier and a frequency divider.

The input first local oscillation signal is frequency multiplied by a positive integer M other than 0 by a frequency multiplier, divided by a positive integer N other than 0 by a frequency divider, and is then output. That is, assuming that the oscillation frequency of the first local oscillator 110 input to the frequency conversion circuit 119 is Frx, the frequency Flo of the signal output from the frequency conversion circuit 119 is expressed by the following equation.

$$Flo = (M/N) \cdot Frx \quad (8)$$

Figure 2:
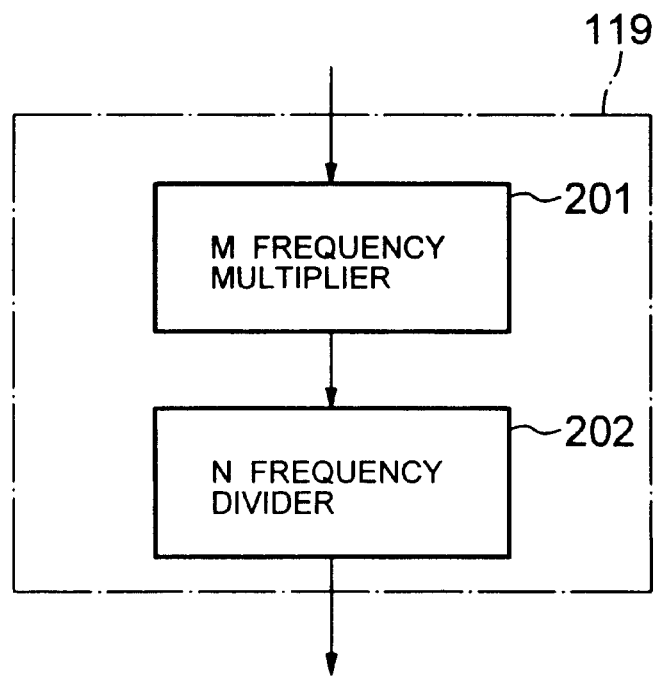
FIG. 2 is a block diagram showing an example of a frequency conversion circuit 119 shown in FIG. 1.
Figure 3:
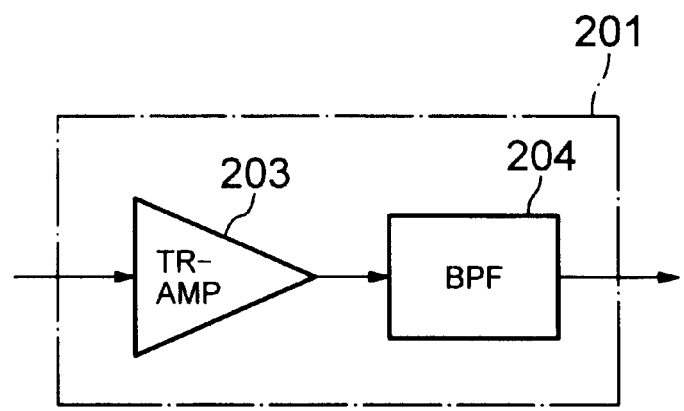
FIG. 3 is a block diagram showing an example of an M frequency multiplier 201 shown in FIG. 2.

FIG. 2 shows an example of the frequency conversion circuit 119 comprising an M frequency multiplier 201 and an N frequency divider 202. The M frequency multiplier 201 comprises a transistor amplifier 203 provided with the transistor as an amplification element, for example, as shown inf FIG. 3, and selects and extracts the M-th order higher harmonics obtained by the nonlinearity of the transistor through a band pass filter (BPF) 204. An output of the BPF 204 is output as a multiplication output, thereby obtaining a frequency multiplication output in a so-called analog process. On the other hand, it is desired that the N frequency divider 202 shown in FIG. 2 uses a digital frequency dividing circuit.

According to the present embodiment, in the process of frequency-converting a signal by the frequency conversion circuit 119, the method of dividing a frequency after multiplying the frequency is described, but it is obvious that the present invention can attain the object in the method of multiplying a frequency after dividing the frequency.

The transmission signal of the radio frequency band output from the frequency converter 117 passes through the band pass filter 116, the high frequency amplifier 115, and the band pass filter 114, and is input to the transmission amplifier 113. The transmission signal input to the transmission amplifier 113 is amplified up to the power to be output from the antenna 101, and is then output. The transmission signal output from the transmission amplifier 113 passes through the isolator 112 and the transmission and reception common circuit 102, and is output from the antenna 101.

Described below will be the frequency used in the radio process of the direct conversion radio set according to the present invention. The frequency used in transmission and reception to and from a base station not shown in the attached drawings is predetermined, and it is assumed that the reception frequency is Frx, the transmission frequency is Ftx, and Frx>Ftx. Since the reception frequency is Frx, the oscillation frequency of the first local oscillator is Frx.

The frequency of a local signal used in the frequency converting process by the frequency converter 117 in the transmission system is expressed by the equation (8). Based on the equation (8) and the transmission frequency Ftx, the intermediate frequency Ftxif of the transmission system is expressed as follows.

$$Ftxif=Flo-Ftx=(M/N)\cdot Frx-Ftx \qquad (9)$$

The equation refers to the oscillation frequency of the second local oscillator.

Thus, the direct conversion radio set according to the present invention is provided with the frequency conversion circuit 119 configured by a frequency multiplier and a frequency divider. The frequency converter 117 configuring the transmission system of the radio set multiplies the frequency of the local oscillation signal for use in frequency converting the transmission signal of the intermediate frequency band into the transmission signal of the radio frequency band by a positive integer M other than 0 using the frequency conversion circuit 119, then frequency divides the result by a positive integer N other than 0, and uses the result for a frequency converting process (M≠N).

Therefore, the intermediate frequency of the transmission system does not match the frequency shown by the equation (1), and no interference wave is generated for a received signal although the transmission signal and the signal of the intermediate frequency band of the transmission system leak to the reception system because the local oscillation signal for use in frequency converting the transmission signal of the intermediate frequency band into the transmission signal of the radio frequency band by the frequency converter 117 is frequency multiplied by a positive integer M other than 0 by the frequency conversion circuit 119 comprising a frequency multiplier and a frequency divider, and then frequency divided by a positive integer N other than 0. Therefore, the intermediate frequency Ftxif of the transmission system is expressed by the equation (9). As the result, when the transmission signal and the transmission signal of the intermediate frequency band leak to the reception system, that is, although when Ftx+Ftxif are leak to the reception system, the frequency (M/N)·Frx is different from the reception frequency band Frx as indicated by the equation (7), thereby causing no interference wave for a received signal.

Furthermore, in the process of converting the frequency by the frequency conversion circuit 119, a frequency dividing process is performed after a frequency multiplying process, but the object of the present invention can be attained and the above mentioned effect can be obtained by dividing a frequency by a positive integer N other than 0, multiplying the frequency by a positive integer M other than 0, and frequency-converting the oscillation frequency of the first local oscillator 110.

Figure 4:
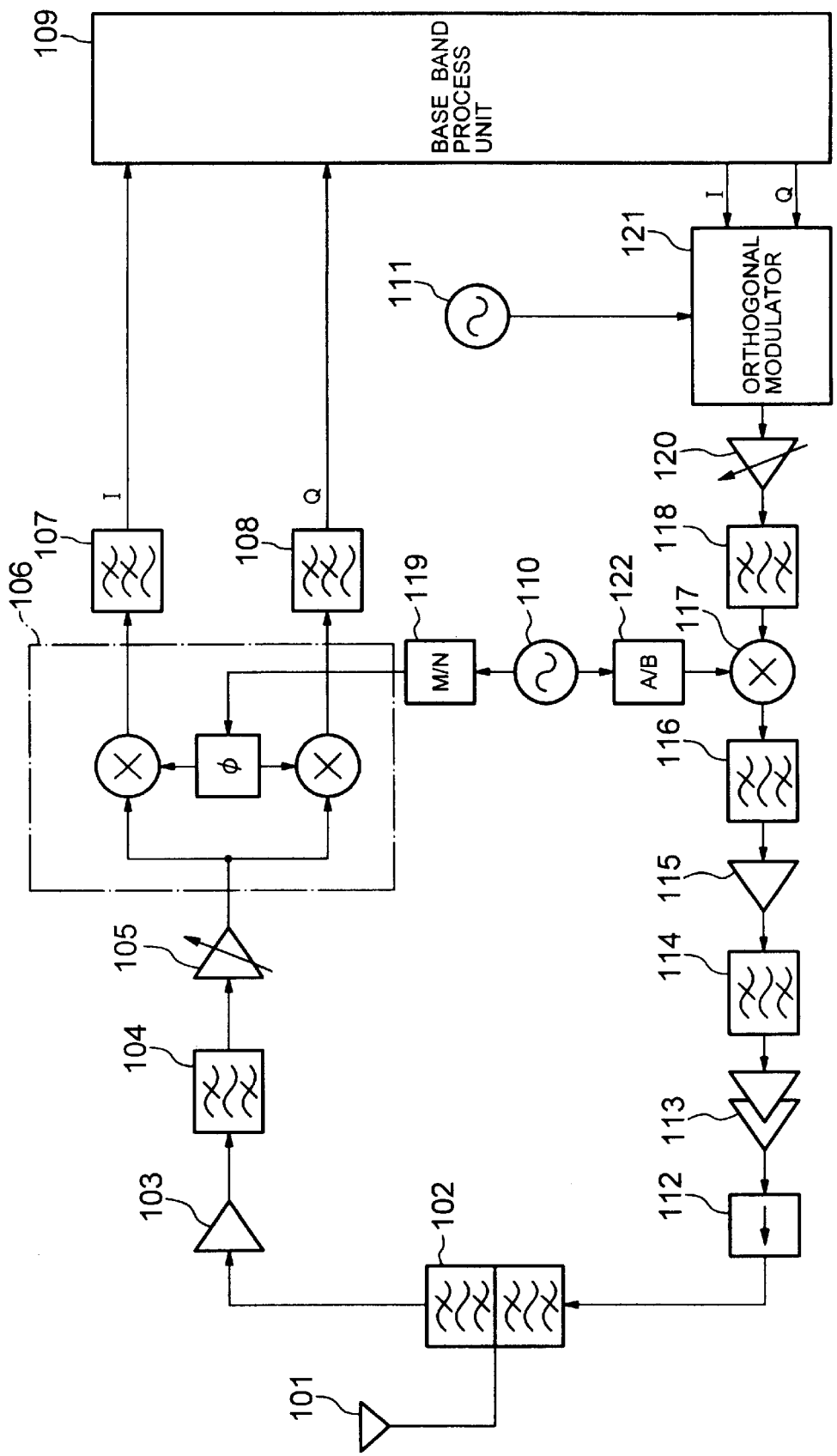
FIG. 4 is a block diagram showing another embodiment of the present invention.

FIG. 4 is a block diagram showing another embodiment of the present invention, and the units also shown in FIG. 1 are assigned the same reference numerals. According to the present embodiment, the oscillation output frequency of the first local oscillator 110 provided for the reception system is converted into M/N times by the frequency conversion circuit 119. Correspondingly, the oscillation output frequency of the first local oscillator 110 provided for the transmission system is converted into A/B times (A and B are integers and A≠B) by a frequency conversion circuit 122. Otherwise, the configuration is the same as that shown in FIG. 1, and the detailed explanation is omitted here.

In this case, as expressed by the above mentioned equation (1), the frequency of the received signal is equal to the oscillation frequency of the first local oscillator 110. Therefore, assuming that the frequency of the first local oscillation signal is F, and the reception frequency is Frx, a signal having the frequency of (M/N)·F=Frx can be input to the input terminal of the first local oscillation signal of the orthogonal demodulator 106. However, in this case, since the local oscillation signal frequency Flo of the transmission system is to be Flo=(A/B)·F, the frequency conversion circuit 122 converting the oscillation frequency of the first local oscillator 100 into A/B times is inserted between the first local oscillator 110 and the frequency converter 117. The configuration of the frequency conversion circuit 122 can be the same as the configuration shown in FIGS. 2 and 3.

Figure 5:
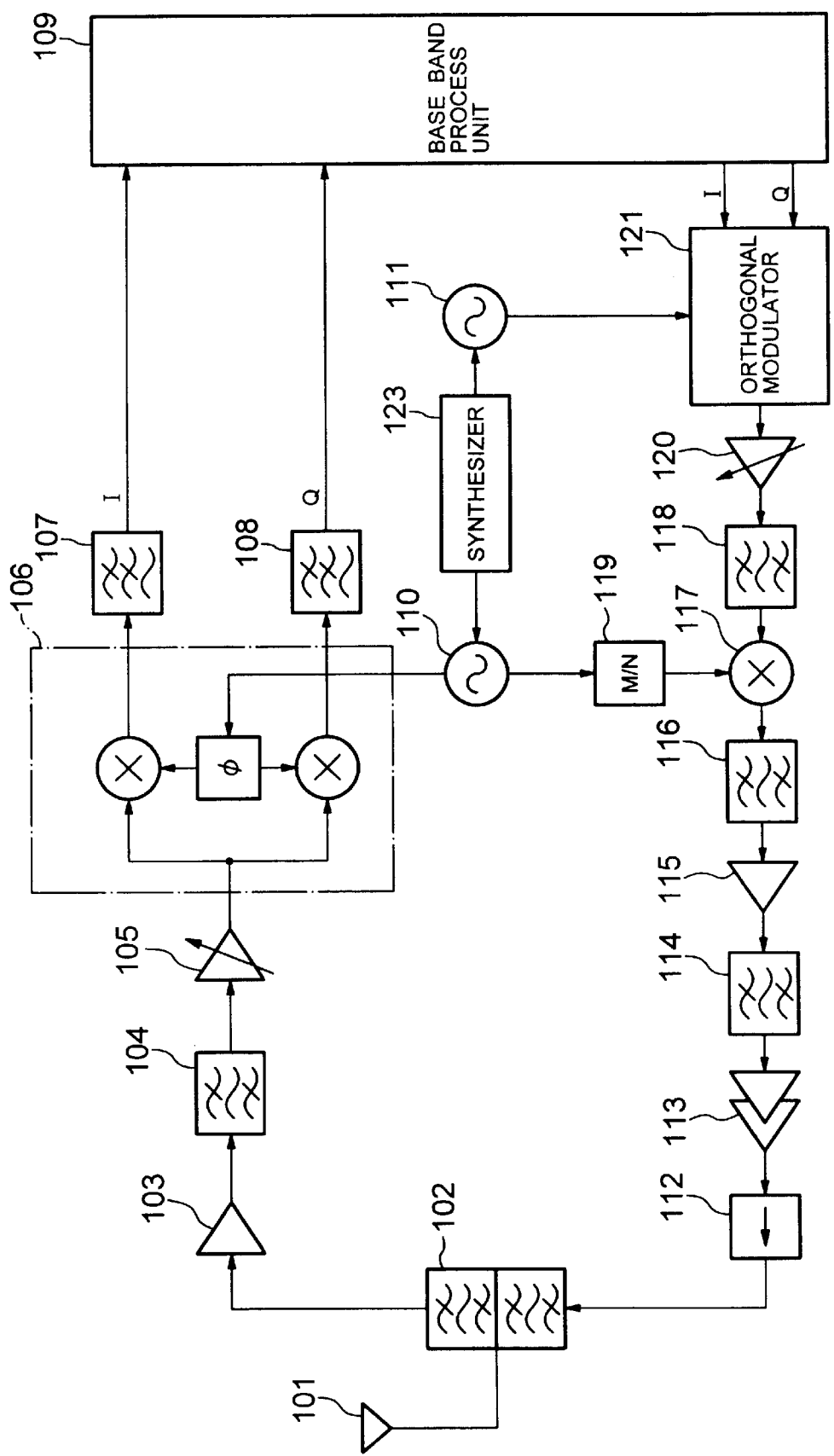
FIG. 5 is a block diagram showing a still another embodiment of the present invention.
Figure 6:
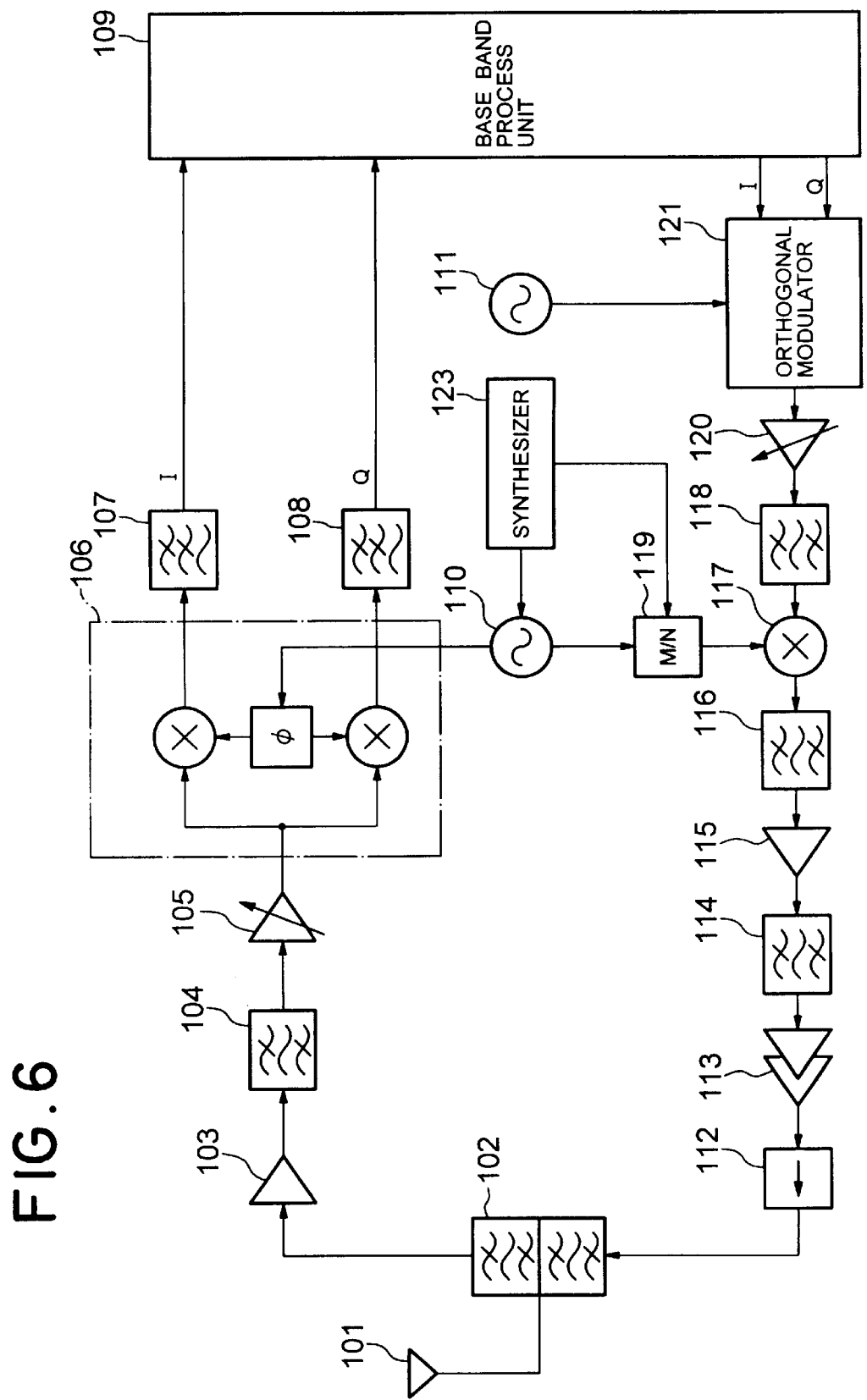
FIG. 6 is a block diagram showing a yet another embodiment of the present invention.

Each of the above mentioned embodiments can be applied when each channel frequency in transmission and reception is singular, that is, the transmission and reception waves are a single wave (1 channel), and the transmission and reception wave channels can be optionally varied, and furthermore, the radio set of the communications system changes with predetermined regularity (except the regularity with which transmission and reception wave channels change while constantly maintaining predetermined intervals). However, in the radio set in the WCDMA (wide band code division multiple access) system, it is necessary that a transmission and reception wave channels change while constantly maintaining predetermined intervals. Therefore, in this case, the configuration shown in FIG. 5 or 6 is adopted. In FIGS. 5 and 6, the units also shown in FIG. 1 are assigned the same reference numerals.

In FIG. 5, with the configuration according to the embodiment shown in FIG. 1, the present invention is applied to the case in which transmission and reception channels are changed with predetermined intervals constantly maintained. A synthesizer 123 variably controls the frequencies of the first and second local oscillators 110 and 111 to constantly maintain predetermined intervals. Otherwise, the configuration is the same as that of the example shown in FIG. 1. According to the present embodiment, as in the case shown in FIG. 1, the transmission from the transmission system to the reception system does not cause interference.

Referring to FIG. 6, in place of the fact that the synthesizer 123 controls the second local oscillator 111 shown in FIG. 5, the value of M/N (frequency conversion constant) of the frequency conversion circuit 119 is variably controlled such that the transmission and reception channels can constantly maintain predetermined intervals. In the variable control of the value of M/N, the value of M/N is written in a read-only memory in advance corresponding to a channel, and the synthesizer 123 reads the value of M/N from the read-only memory depending on the variable channel, and defines it as M/N which is a conversion value of the frequency conversion circuit 119.

As described above, according to the present invention, means for converting the frequency of a local oscillation signal is provided in the frequency converter of the transmission system such that the intermediate frequency of the transmission system cannot be equal to the difference between the reception frequency and the transmission frequency. Thus, although a sum signal of the transmission frequency and the intermediate frequency of the transmission system leak to the reception system, it does not function as a reception frequency. Therefore, the signal of the transmission system does not enter the received signal frequency band of the reception system, thereby avoiding the interference from the transmission system to the reception system.

What is claimed is:

1. A radio set having a reception system utilizing a direct conversion system and a transmission system utilizing a single conversion system, comprising:

a local oscillator which provides a local signal for both direct conversion in the reception system and single conversion in the transmission system; and first frequency conversion means which converts the local frequency of said local oscillator prior to input to a frequency converter of the transmission system such that the local signal provided to the reception system is different from the local signal provided to the transmission system, wherein an intermediate frequency of said transmission system is not equal to a difference between a reception frequency and a transmission frequency.

2. The radio set according to claim 1, further comprising:

second frequency conversion means which converts the local frequency of said local oscillator prior to input into said reception system.

3. The radio set according to claim 1, wherein said first frequency conversion means comprises a multiplication unit for multiplying the oscillation frequency of said local oscillator by a conversion constant.

4. The radio set according to claim 3, wherein said multiplication unit comprises at least one of a frequency multiplier and a frequency divider.

5. The radio set according to claim 4, wherein said frequency multiplier is an M (positive number other than 0) multiplier, and said frequency divider is an N (positive number other than 0, and M≠N) divider.

6. The radio set according to claim 1, further comprising channel control means for variably controlling channel frequencies of said transmission system and said reception system simultaneously.

7. The radio set according to claim 6, wherein said channel control means is configured such that the oscillation frequency of said local oscillator and a conversion constant of said first frequency conversion means can be variably controlled.

8. The radio set according to claim 7, wherein said channel control means controls said transmission and reception channel frequencies such that the transmission and reception channel frequencies can constantly maintain predetermined intervals.

9. The radio set according to claim 8, wherein said radio set is used in a WCDMA communication system.

10. The radio set according to claim 6, further comprising a second local oscillator for orthogonally modulating a base band signal in said transmission system, wherein said channel control means variably controls the oscillation frequencies of said second local oscillator and the local oscillator of said transmission and said reception systems.

11. A frequency converting method for use with a radio set having a reception system utilizing a direct conversion system and a transmission system utilizing a single conversion system, and having a local oscillator which provides a local signal for both direct conversion in the reception system and single conversion in the transmission system, comprising:

converting the local frequency of the local oscillator prior to input to a frequency converter of the transmission system such that the local signal provided to the reception system is different from the local signal provided to the transmission system, wherein an intermediate frequency of said transmission system cannot be equal to a difference between a reception frequency and a transmission frequency.

12. The frequency converting method according to claim 11, further comprising:

converting the local frequency of the local oscillator prior to input into said reception system.

13. The frequency converting method according to claim 11, further comprising the step of variably controlling channel frequencies of said transmission system and said reception system simultaneously.

14. The frequency converting method according to claim 13, comprising the step of:

simultaneously and variably controlling oscillation frequencies of a second local oscillator for orthogonally modulating a base band signal in said transmission system and a local oscillator of said transmission and said reception systems.

15. The frequency converting method according to claim 13, wherein said transmission and reception channel frequencies can be variably controlled such that said frequencies can constantly maintain predetermined intervals.

16. The frequency converting method according to claim 15, wherein said method is used in a WCDMA communication system.

* * * * *